Jan. 1, 1924

C. O. BECH 1,479,023

SPEED CONTROL MECHANISM

Filed Jan. 4, 1922     6 Sheets-Sheet 1

Fig. 1.

Inventor
Charles O. Bech
By C. P. Goepel
his Attorney

Jan. 1, 1924.  
C. O. BECH  
1,479,023  
SPEED CONTROL MECHANISM  
Filed Jan. 4, 1922  
6 Sheets-Sheet 3

Fig. 3.

Inventor  
Charles O. Bech  
By C. P. Goepel  
his Attorney

Jan. 1, 1924. 1,479,023

C. O. BECH

SPEED CONTROL MECHANISM

Filed Jan. 4, 1922    6 Sheets-Sheet 4

Inventor
Charles O. Bech
By C. P. Goepel
his Attorney

Jan. 1, 1924. 1,479,023
C. O. BECH
SPEED CONTROL MECHANISM
Filed Jan. 4, 1922    6 Sheets-Sheet 6

Inventor
Charles O. Bech
By C. P. Goepel
his Attorney

Patented Jan. 1, 1924.

1,479,023

UNITED STATES PATENT OFFICE.

CHARLES O. BECH, OF WEEHAWKEN, NEW JERSEY.

SPEED-CONTROL MECHANISM.

Application filed January 4, 1922. Serial No. 527,007.

*To all whom it may concern:*

Be it known that I, CHARLES O. BECH, a citizen of the United States, and a resident of Weehawken, county of Hudson, and State of New Jersey, have invented certain new and useful Improvements in Speed-Control Mechanism, of which the following is a specification.

This invention relates to speed control mechanism, and while it is of more or less general application to control the operating speed of a driven part, it is particularly devised for the purpose of controlling the speed of automotive vehicles.

As is well known, modern power driven vehicles are equipped with friction brakes for the purpose of checking and controlling the speed of the vehicle. Such brakes are more or less unreliable and the brake linings must be frequently renewed due to excessive wear and heating. I am aware of the fact that it has been proposed to provide hydraulic means for the purpose of actuating such friction brakes, but in so far as the art has been developed, I believe it to be new and original to utilize hydraulic means for directly applying the braking action and wherein the use of friction bands and other non-positive braking means is entirely eliminated.

Generically considered, my present invention, therefore, comprehends a hydraulic brake mechanism subject to suitable control whereby the power output of the engine or the propelling force due to momentum of the vehicle or in going down grade may be absorbed to greater or less extent at any suitable point in the line of power transmission to thereby control and reduce the speed of the axle or other driven part to a corresponding extent.

In one embodiment of my present invention, the device may be incorporated in the transmission gearing of a motor vehicle, applied directly to the driven axle, or mounted as a separate unit and suitably connected to the axle. The driving power due to momentum or going down grade of the automotive vehicle is absorbed by a pump geared to the driven shaft and operating to pump liquid under pressure from a reservoir, the liquid being returned to said reservoir through an adjustable valve, the adjustment of the valve to a predetermined position regulating the percentage of power absorbed by the pump and thus limiting the power transmitted to the shaft or axle accordingly.

It is another object of my invention to provide hydraulic means for controlling the speed of automotive vehicles within certain predetermined limits, irrespective of whether the vehicle is being propelled by the motor or engine or is coasting down a grade, or both.

It is another important object of my invention to provide an improved valve for controlling the circulation of the oil or other liquid through the pump and which may be entirely or partly closed if desired to partially or entirely stop the transmission of power. Thus an effectual check or brake on the speed of the vehicle is obtained, and the usual friction brakes need be operated only while the vehicle is at rest. Thus the necessity of constantly adjusting such friction brakes and replacing friction surfaces is avoided as they are used only in cases of emergency or when the vehicle is not being operated.

Further objects of the invention reside in the provision of easily operated control means for the hydraulic brake mechanism requiring little exertion on the part of the operator, better traction and the elimination to a large extent of skidding and excessive wear of the tires resulting therefrom.

With the above and other objects in view, the invention consists in the improved hydraulic speed control mechanism and in the form, construction and relative arrangement of its several parts as will be hereinafter more fully described, illustrated in the accompanying drawings and subsequently incorporated in the subjoined claims.

In the drawings wherein I have illustrated several desirable embodiments of the invention and in which similar reference characters designate corresponding parts throughout the several views:

Figures 7 and 8 are sectional views partly in elevation showing an alternative embodiment of the invention;

In the preferred embodiment of my invention as shown in Figures 1 to 6 of the drawings, the mechanism is illustrated as being mounted and arranged for operation as a separate unit. It may, however, be incorporated in the transmission mechanism of a motor vehicle or arranged directly upon the driven axle. In any event, there is provided a reservoir 5 for oil or any other suitable non-compressible liquid. This reservoir likewise serves as a casing or housing for the operating parts of the mechanism. A driven shaft or axle 6 is supported in suitable bearings 7 in the opposite side walls of the reservoir 5, said shaft extending centrally through a casting 8 which may be rigidly mounted and supported within the reservoir.

Figure 1:
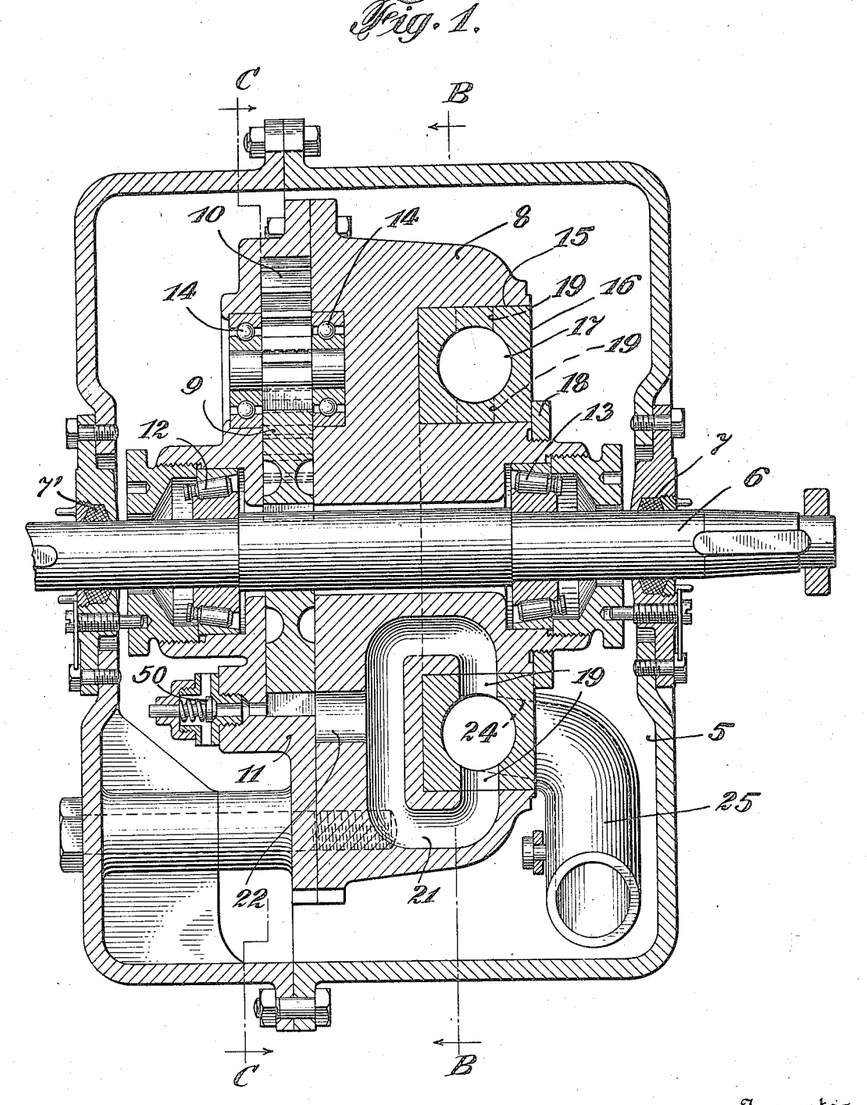
Figure 1 is a longitudinal section taken on the line A—A of Figure 2 and illustrating one example and practical embodiment of the device.
Figure 2:
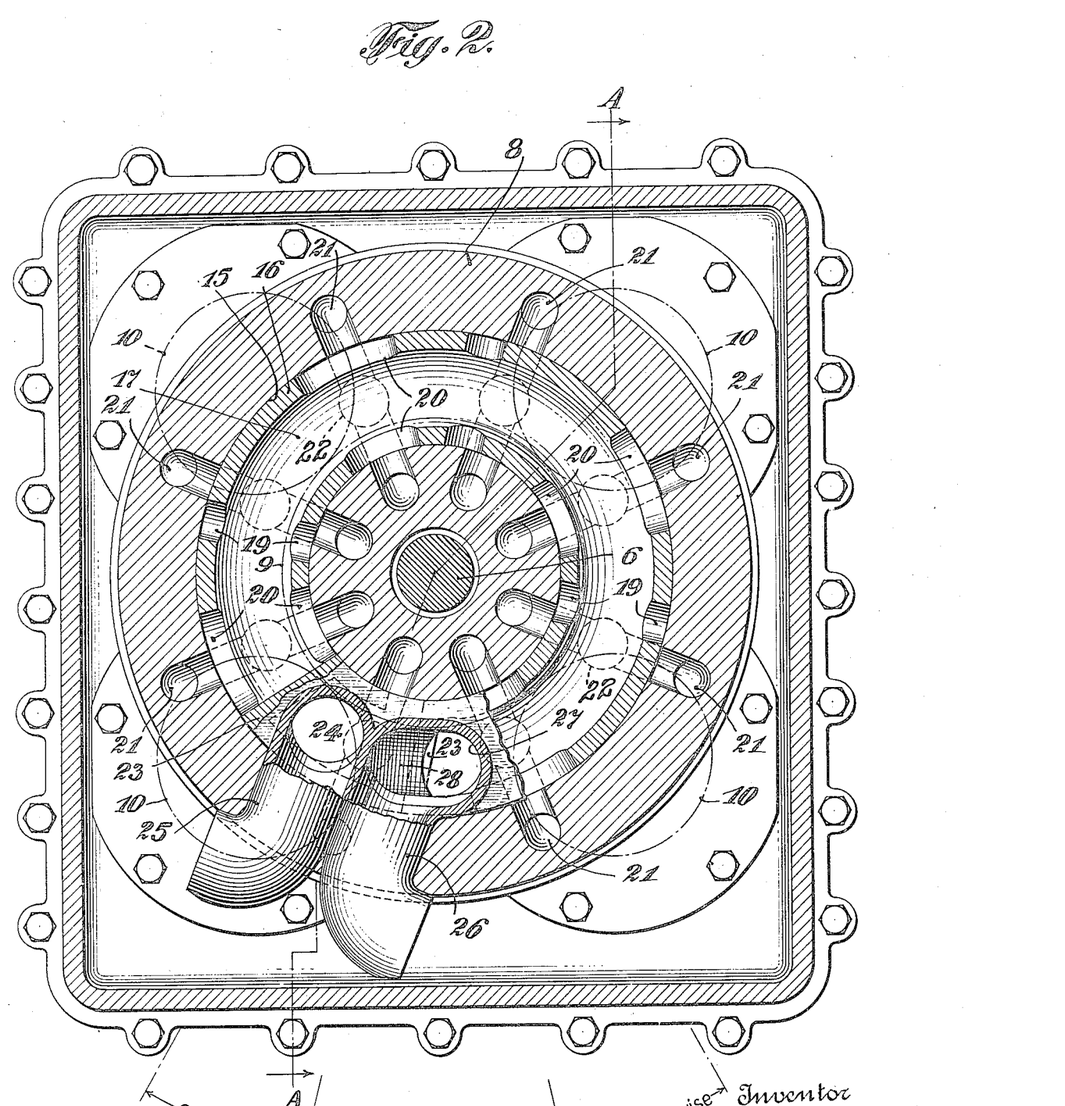
Figure 2 is a section taken on the line B—B of Figure 1.
Figure 3:
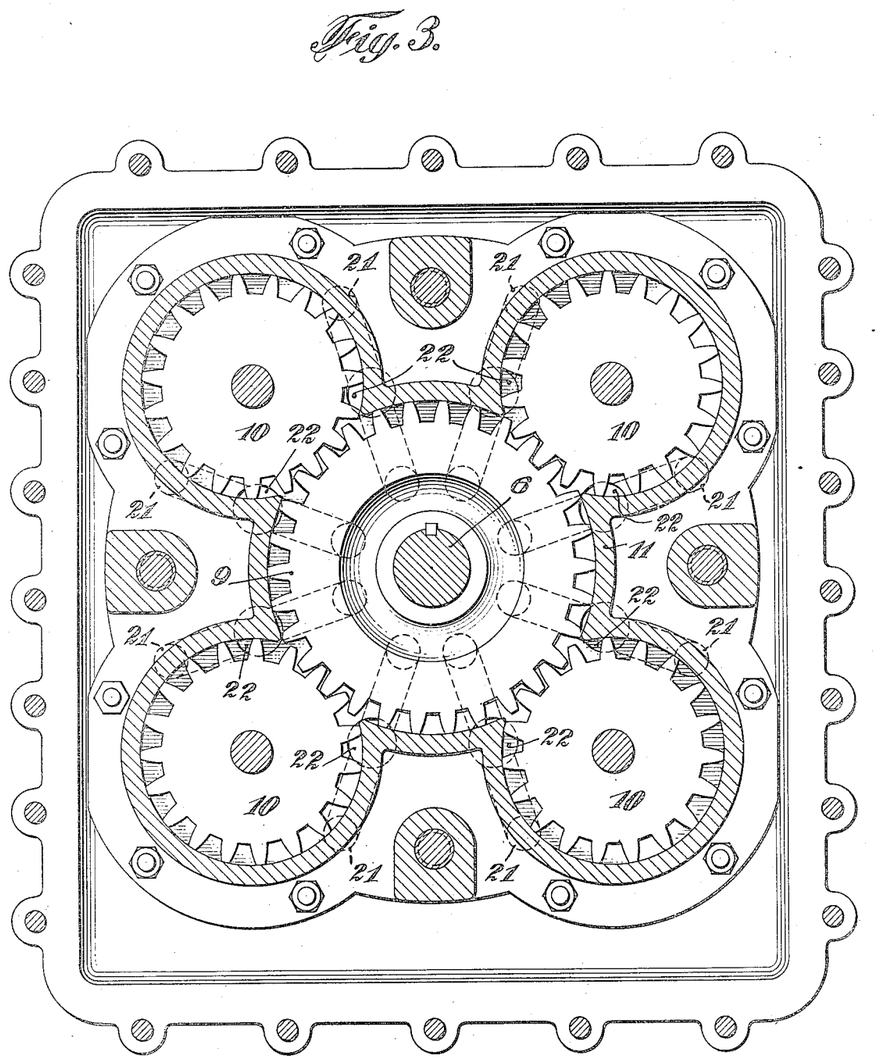
Figure 3 is a section taken on the line C—C of Figure 1.

At one side of the casting 8 the gear 9 is keyed or otherwise fixed to the driven shaft 6 and meshes with a series of gears 10. In the present instance I have illustrated four such gears 10 spaced apart 90° from each other around the gear 9. A cover plate 11 extends over the gears 9 and 10 and is provided with a suitable anti-friction bearing 12 for the driven shaft 6. A similar bearing 13 is also mounted in the opposite side of the casting 8. The axis of each gear 10 is likewise mounted in ball-bearings 14 arranged in the cover plate 11 and in the face of the casting 8.

The casting 8 is provided in the side face thereof opposite to the gears 9 and 10 with an annular channel 15 of rectangular form in cross-section. This channel receives the annular adjustable valve member 16 which is provided with a cylindrical bore or passage 17. The valve member 16 is retained in the channel 15 for rotary movement by means of the ring or annulus 18 which is threaded upon a boss or projection on the face of the casting 8. However, any other suitable means might be employed for preventing the displacement of the annular valve member from its operative position.

The portions of the annular valve 16 at opposite sides of the bore 17 are provided with ports 19 which are of circular form and in alternate relation to these ports are the circumferentially elongated ports 20, all of said ports communicating with the bore 17.

The casting 8 is formed with a plurality of radially disposed passages 21 therein, the ends of which open upon opposite sides of the annular channel 15 in which the valve member 16 is arranged. A port 22 communicating with the intermediate portion of each passage 21 opens upon the opposite side face of the casting 8. From reference to Figure 3 of the drawings it will be noted that the radial passages 21 in the casting 8 are located on opposite sides of each of the gears 10 and the outer ends of the ports 22 are disposed contiguous to the points of contact of the teeth of said gears with the gear 9.

The bore 17 of the annular valve member is interrupted by spaced webs 23 forming a chamber 24 therebetween. With this chamber adjacent one of its ends one pair of ports or openings 19 communicate. The valve member 16 carries tubes 25 and 26 respectively, the open ends of which are laterally turned in relatively opposite directions and extend into the body of oil contained in the reservoir 5. The tube 25 at its other end communicates with the chamber 24. The corresponding end of the tube 26 is elongated circumferentially of the valve member as shown at 27 and a web 28 extends from the side of this end of said tube which is adjacent to the other tube 25 to one of the webs 23 so that the lower area of the tube 26 is in communication with the chamber 24, while the upper area thereof is in communication with the bore 17 of the valve member beyond the web 23.

Any suitable means may be provided for adjusting the annular valve member 16 and positioning its ports 19 and 20 with relation to the passages 21 in the casting 8 whereby the circuitous flow of the oil or other liquid through said passages and between the intermeshing gears may be properly controlled to impress a braking influence upon the driven shaft 6.

The gears 9 and 10 operate in the manner of an ordinary gear pump. Thus in the rotation of the gear 9 in one direction, as the teeth of said gear approach the teeth of the gears 10 suction is induced incident to the tendency to create a vacuum through the adjacent ports 22 and as the teeth of the gear 9 leave or recede from the teeth of the gears 10, pressure is created through the other ports 22. Thus so long as there is open communication between the passages in the casting 8 and the oil containing reservoir, the free and unretarded circulation of the oil is permitted and there is a continuous flow of the oil around and between the gears 9 and 10 as it is constantly drawn from the reservoir 5 and returned to said reservoir.

Figure 4:
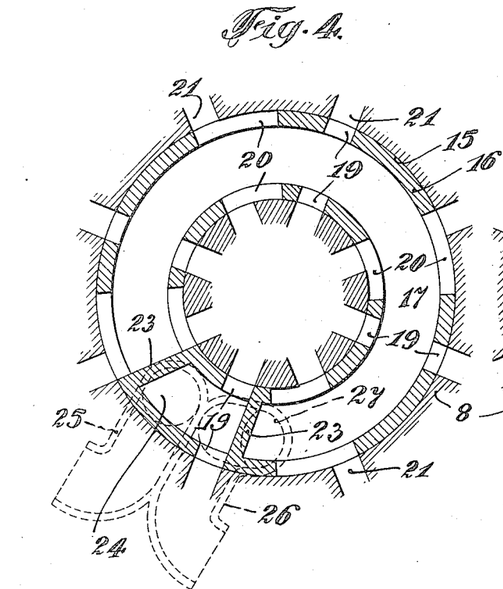
Figures 4, 5 and 6 are fragmentary sectional views showing different positions of the adjustable speed regulating valve.
Figure 5:
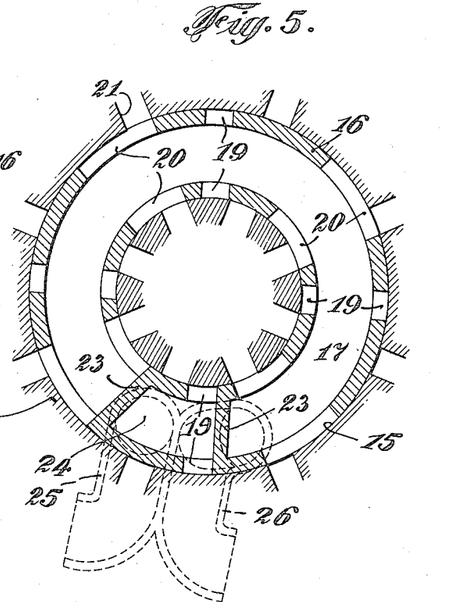

In Figure 4 of the drawings I have shown the valve member 16 in such full open position to permit of the clockwise rotation of the shaft 6 at maximum speed and it will be observed that the ports 19 communicating with the chamber 24 are in full registration with the passage 21 which communicates with the port 22 located at the right hand side of the lower left hand gear 10 through which suction is created in the intermeshing of the teeth of said gear with the teeth of the gear 9. The pumping action causes the oil to be circulated successively through the other passages 21 and it is finally discharged from the bore 17 of the valve member over the web 28 and returned to the reservoir through the tube 26. Upon reference to Figure 1 of the drawings it will be noted that the valve member 16 has been shifted slightly to the right of the position seen in Figure 4 and the ports 19 are only partially in registration with the ends of the passages 21. Thus the free flow of the oil is partially checked and a braking or retarding influence transmitted through the gearing to the driven shaft 6. If the valve member is rotated to a fully closed position as seen in Figure 5 of the drawings, the greatest braking action is applied. It will be understood, however, that the shaft 6 will never be entirely locked against rotation as there will be some leakage of the oil.

Figure 6:
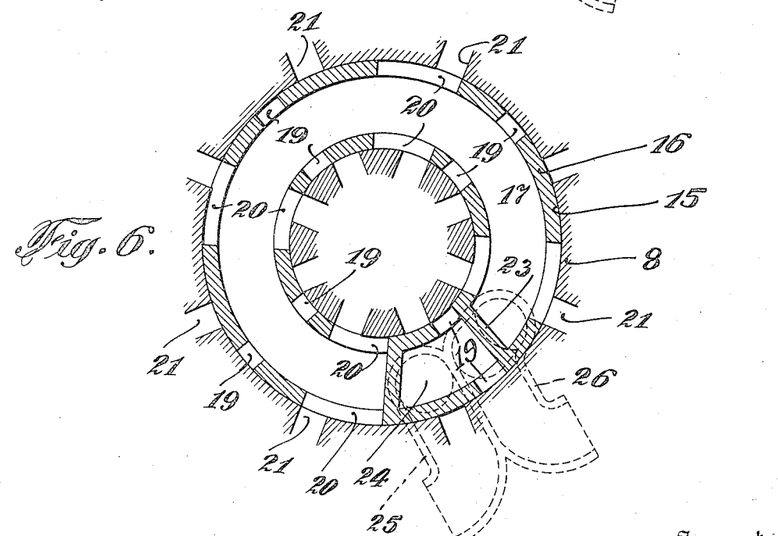

In Figure 6 of the drawings I have shown the valve member 16 in position for applying a braking action in the anti-clockwise rotation of the shaft. As illustrated, the passage 21 in communication with the port 22 at the left hand side of the lower right hand gear 10 which now becomes the suction port, is fully closed and a maximum braking action is applied. By shifting the valve member 16 towards the left, communication between said passages and the chamber 24 is partially opened. The oil is thus again drawn from the reservoir and circulated by the pumping action of the gears. It will thus be seen that by merely shifting the valve 16 to a predetermined position, any desired proportion of the power generated by the motor or engine may be absorbed so as to thereby reduce power transmitted to the wheels or other parts through the shaft 6. For the purpose of relieving the fluid pressure and limiting the braking effect on the driven shaft, I preferably provide one or more release valves 50.

It is of course understood that in some cases it may be necessary to provide the casing or housing with a cooling means for the oil or other hydraulic medium as considerable heat is generated in the operation of the device. However, as such cooling means constitutes no essential part of the present invention it is not herein shown or described in detail.

Figure 8:
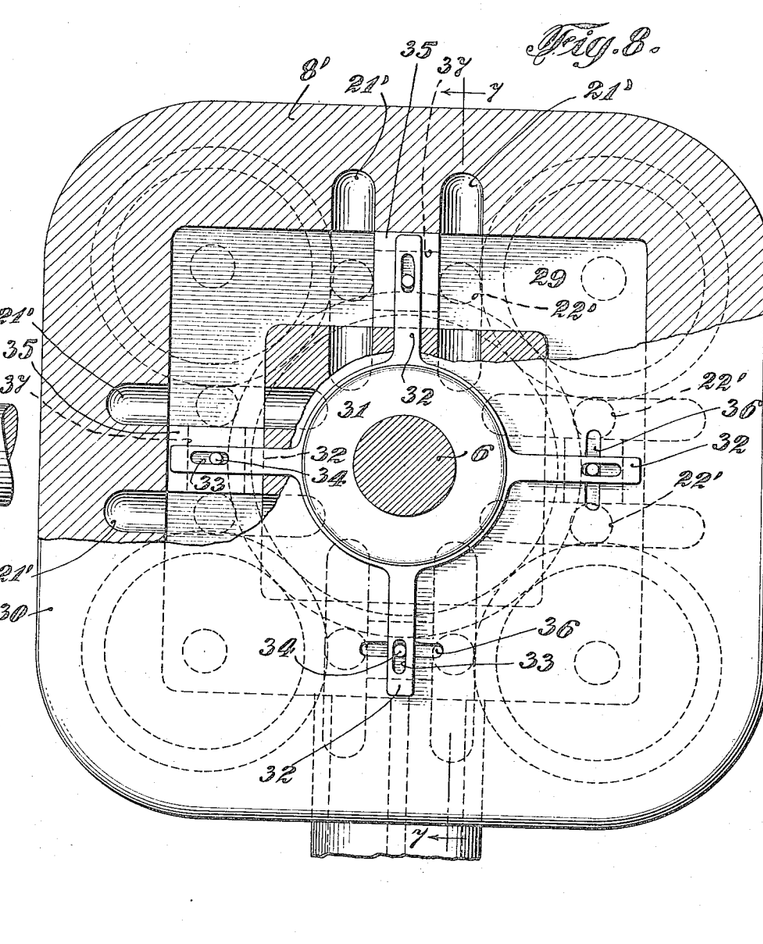

In Figs. 7 and 8 of the drawings, I have shown an alternative embodiment of the invention wherein, instead of circulating the oil or other fluid through a shiftable annular valve member, the oil circulated through a continuous rectangular chamber 20 formed in one side face of the casting 8', upon the other side of which the pump gearing is arranged in the manner above explained. The circulating passages 21' in the casting are also of similar form to those previously referred to and communicate at their ends with opposite sides of the chamber 29, said passages intermediate of their ends opening through the ports 22' between the intermeshing gear elements of the pump.

The open side of the chamber 29 is closed by the plate 30 fixed to the face of the casting 8' and upon the drive shaft a shiftable spider 31 is loosely supported. Each of the radially extending arms 32 of this spider has a longitudinally extending slot 33 to receive a pin 34 fixed in a movable valve member 35 arranged in the chamber 29 between each pair of the passages 21', said pins also extending through slots 36 in the plate 30. It will thus be apparent that by simply shifting the spider circumferentially on the drive shaft the valve members 35 may be moved to close the suction ports 22' to any desired extent whereby the main driving gear of the pump is subjected to the hydraulic influence of the oil or fluid and a corresponding braking force is impressed on the drive shaft. Each of the valve members 35 has an opening 37 extending therethrough which permits of the free circulation or flow of the oil through the chamber 29 between the inlet and outlet connections to the reservoirs.

Figure 9:
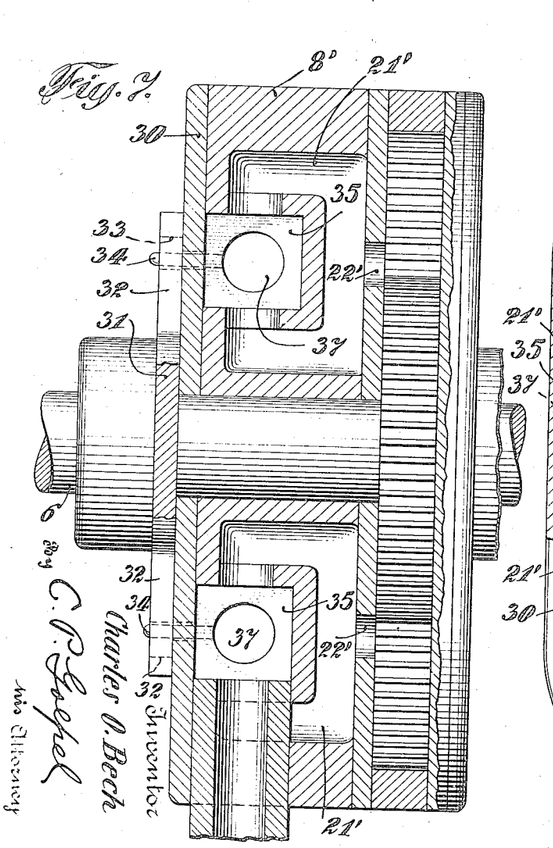
Figure 9 is an elevation partly in section illustrating another modified construction.
Figure 10:
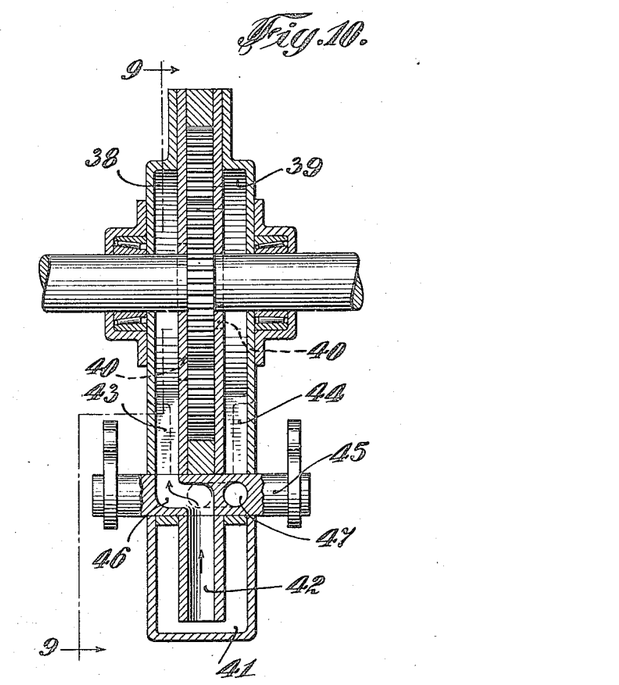
Figure 10 is a section taken on the line 10—10 of Figure 9.

In Figs. 9 and 10 of the drawings I show another form of the invention wherein the gear pump is arranged between two fluid circulating chambers 38 and 39 respectively, ports 40 being provided in the side plates of the gear casing affording communication between said chambers and the space between the intermeshing gears. The chambers 38 and 39 communicate with the oil reservoir 41 through a common tube 42, the upper end portion of which has branches 43 and 44 respectively, which open into the base portion of the respective chambers. A rotary valve member 45 is mounted between the branches of the tube and the main portion 42 which extends into the oil reservoir. This valve member is provided with angular ports 46 and 47 therein which are disposed at angles of 90° with respect to each other. When the valve is in the position seen in Fig. 10, the port 46 thereof connects the chamber 38 with the oil reservoir through the tube 42 so that the oil will be drawn by suction into the gear case through one set of the ports 40 and discharged by pressure into the other chamber 39 through the other set of ports 40. From this latter chamber the oil flows through the other port 47 of the valve member back into the reservoir. Thus by adjusting the valve the circulation of the oil through the gear pump may be controlled and the desired braking force applied to the driven shaft in its rotation in one direction. When said shaft is driven in the opposite direction, the same braking action may be produced by rotating the valve member 45 through 90° to connect the other port 47 with the chamber 39 and tube 42 leading to the oil reservoir so that the direction of circulation of the oil through the gear case is reversed.

Figure 11:
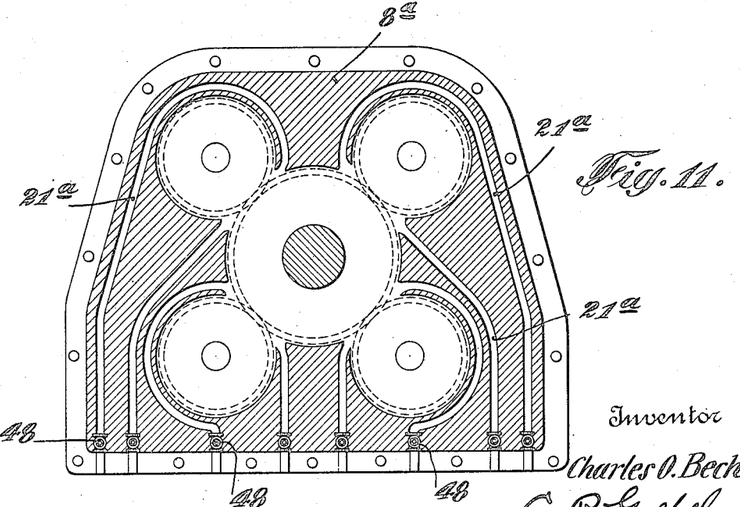
Figure 11 is a sectional view showing still another form of my invention.

In Fig. 11 another construction is illustrated in which the same gear pump as hereinbefore described, is employed, but wherein each of the oil circulating passages 21ª in the casting 8ª which communicates with the spaces adjacent the points of engagement of the gear teeth is provided with an individual valve 48 for variably regulating the flow of the oil therethrough. Suitable means may be provided for operating these valves 48 in unison so that they will all be moved to the same extent towards their open or closed position.

While I have above described several possible mechanical means for carrying out the principle of my present invention, it is of course possible to devise still other mechanical constructions which would produce the desired result. The essential consideration resides in the provision of an element directly fixed to the driven shaft with means for subjecting said element to the variable hydraulic influence of a fluid under pressure so as to thereby impress a variable braking force upon said shaft by the absorption of power. The advantages incident to the application and use of such a hydraulically influenced braking mechanism in connection with automotive vehicles are many. Thus the gear pump may be conveniently connected at one side of the power transmission and the transmission case employed as the oil-containing reservoir. On the other hand, the gear pump might be mounted directly in the rear axle housing thus using the axle housing as the oil-containing reservoir or mounted directly upon the driven axle and provided with a self-contained oil reservoir, or connected with a separate reservoir located at a remote point. Owing to the fact that the pressures acting upon the movable valve member are balanced no great effort is required upon the part of the operator in order to properly adjust and position said valve. The direct application of the braking force to the shaft or axle through the medium of a hydraulically influenced member fixed thereon insures a proper braking action under all conditions, no reliance being placed upon frictional brake bands engaging wheel drums, as is now the common practice. It may be desirable to use such friction brakes in cases of emergency or for locking the wheels when the vehicle is at rest. The speed of the vehicle is at all times under the absolute control of the driver and as the wheels of the vehicle are never entirely locked, better traction may be obtained upon slowing down by the use of the present invention. Such a braking mechanism will also be reliable and positive in operation and as there are no friction bands or other parts which require frequent replacement, the necessity of making repairs and the expense incident thereto is reduced to a minimum.

From the foregoing description considered in connection with the accompanying drawings, the construction and manner of operation of the several illustrated embodiments of the invention will be clearly understood. It will be manifest that the brake mechanism is one of more or less general application and is not necessarily limited in its utility for use upon automotive vehicles. In the other adaptations thereof which may be possible, it is not to be expected that certain mechanical alterations will not be found necessary. Accordingly, while I have herein disclosed several constructions of a practical character, it is nevertheless to be understood that the device might also be exemplified in other alternative forms and I accordingly reserve the privilege of resorting to all such legitimate changes as may be fairly embodied within the spirit and scope of the invention as claimed.

I claim:

1. In combination with a shaft, hydraulically influenced mechanism for impressing a braking force upon said shaft, and means for controlling the distribution of the hydraulic medium to effect a circumferentially balanced application of the braking force upon the shaft.

2. In combination with a driven shaft, controllable hydraulically influenced mechanism including a part fixed to said shaft for directly impressing a braking force thereon, at a plurality of circumferentially spaced points and a single means for simultaneously varying the effective influence of such braking force at each of said points.

3. In combination with a driven shaft, a part fixed thereon, and means for subjecting said part to a balanced variable hydraulic influence to directly impress a braking force upon said shaft.

4. In combination with a driven shaft, a part fixed thereon, means with which said part coacts for circulating a fluid medium, and means for controlling the circulation of said fluid medium to cause to the same to exert a balanced variable hydraulic influence upon said part and directly impress a braking force upon said shaft.

5. In combination with a shaft, a pump forcing liquid under pressure through a closed circuit and including a plurality of liquid impelling elements circumferentially spaced above said shaft, and having a driving connection therewith, and means for controlling the distribution of the liquid to each of said elements to thereby effect a circumferentially balanced application of a braking force to said shaft.

6. In combination with a driven shaft, a pump forcing liquid under pressure through a closed circuit including a driving element fixed upon said shaft, and means for controlling the flow of the liquid through said pump to thereby apply a variable braking force upon said shaft by subjecting said driving element to the balanced variable hydraulic influence of the liquid.

7. In combination with a driven shaft having a gear fixed thereon, means for forcing liquid under pressure through a closed circuit including diametrically opposed gear elements circumferentially spaced about said shaft and in mesh with the gear thereon and intake and outlet ports associated with each of said gear elements, and a hollow annular valve member adjustable to control and equalize the distribution of liquid to the spaced gear elements and thereby effect a circumferentially balanced application of a variable braking force upon said shaft.

8. In combination with a driven shaft, brake mechanism including a gear pump having a driving gear mounted directly on said shaft and a series of gears spaced circumferentially around said driving gear in mesh therewith, a fluid reservoir from which fluid is circulated through a closed circuit by said pump, and means controlling the circulation of the fluid to thereby subject the driving gear to a balanced variable hydraulic influence and directly apply a variable braking force upon said shaft in the rotation of the shaft in either direction.

In testimony that I claim the foregoing as my invention, I have signed my name hereunder.

CHARLES O. BECH.